Patented Feb. 1, 1949

2,460,267

UNITED STATES PATENT OFFICE 2,460,267

MANUFACTURE OF PLASTER OF PARIS

Cuthbert Leslie Haddon, Newark-on-Trent, England

No Drawing. Application November 4, 1944, Serial No. 562,044. In Great Britain December 17, 1942

4 Claims. (Cl. 106—111)

This invention relates to the manufacture of plaster of Paris, its object being to produce plaster of improved strength.

As disclosed in my U. S. Letters Patent No. 2,448,218, dated August 31, 1948, if ground gypsum or the precipitated dihydrate of calcium sulphate be heated in the presence of water in an autoclave at temperatures between 120° and 170° C., the product is the hemihydrate consisting of thin rod or needle shaped crystals which on drying and regauging with water to a creamy consistency, require so much water for gauging that the mechanical strength after setting is complete is not good. The above mentioned process has long been known, and reference may be made to the specifications of British Patents 3225/1903, 5853/1904 and 26,007/1903.

A great improvement was made by autoclaving lumps of gypsum around 120–125° C., drying and suitably regrinding and one such method is described in the U. S. Patent 1,901,051. A much smaller proportion of water is required for gauging the final product. The individual crystals are very much broader relative to their length than if the gypsum is first finely ground.

In some respects the manufacture of plaster is cheaper and more convenient when it proceeds from a basis of ground gypsum. One method of reducing the amount of water used for gauging is to autoclave in a 30 to 35% solution of magnesium sulphate and this is described in the U. S. Patent 1,989,712 of 1935. This method requires very careful washing of the final product, and large concentrations of magnesium sulphate.

In the process of my invention, I proceed from the basis of ground gypsum, adopting also the practice of autoclaving, that is to say effecting the partial dehydration in the presence of water in the liquid state, and under pressure.

By autoclaving is meant heating in the presence of liquid water until the change from gypsum (or dehydrate) to hemihydrate (or anhydrous calcium sulphate) is complete.

In the art of using plaster of Paris it is well known that certain substances operate to retard the setting of the plaster if they are added to the water used for gauging it, and such substances are known in the trade as "retarders." Among them are the soluble fatty acids which contain a single carboxyl group, and salts thereof. These are in quite small quantities effective as catalysts for retarding the setting of plaster.

I have discovered that if the autoclaving of ground gypsum in water in a liquid state and under pressure is performed in the presence of these fatty acid catalysts or their salts the crystals of hemihydrate produced are much squatter than the acicular crystals produced when the catalysts are absent. After filtering and drying the product (taking care to prevent setting as a result of permitting the solution to cool) much less water is required for gauging than is the case when the gypsum has been autoclaved in water only.

Examples of fatty acids which I have used with very good results are palmitic acid, linoleic acid, ricinoleic acid, sulphoricinoleic acid, glycocholic acid and lauroglycocholic acid, each of these contains a single carboxyl group.

The quantity of catalyst required for producing good results is generally not more than 0.1% by weight of the gypsum, and may be substantially less. The autoclaving temperature should not be unduly high and should be between 125°–160° C., because when it rises to 160° or thereabouts the squatness of the crystals tends to be reduced.

There is probably some casual relationship between the retarding function of the fatty acids when they are added to the gauging water, and their function in modifying the crystal shape when they are added to the autoclaving water, but the two effects do not appear to be in direct proportion to each other. At any rate, in practice I have found that the most potent retarders are not always the catalysts which have the most effect on the crystal shape. It does, however, appear that in all cases the rate of change from gypsum to plaster in the presence of the catalysts is somewhat slower than when the autoclaving proceeds in water alone.

What I claim as my invention and desire to secure by Letters Patent of the United States is:

1. A process of producing plaster of Paris comprising mixing ground gypsum with water and substantially one part per thousand of a water-soluble salt of a water-insoluble fatty acid having in its molecule only one carboxyl group, heating the mixture thus obtained with agitation in a closed vessel at a temperature between 125° C. and 160° C. until the gypsum is converted into plaster of Paris consisting mainly of hemihydrate crystals of squat shape, the proportion of water being sufficient to maintain a liquid phase throughout the treatment.

2. A process of producing plaster of Paris comprising mixing ground gypsum with water and substantially one part per thousand of a water-soluble salt of palmitic acid, heating the mixture thus obtained with agitation in a closed vessel at a temperature between 125° C. and 160° C. until the gypsum is converted into plaster of Paris consisting mainly of hemihydrate crystals of squat shape, the proportion of water being sufficient to maintain a liquid phase throughout the treatment.

3. A process of producing plaster of Paris comprising mixing ground gypsum with water and substantially one part per thousand of a water-soluble salt of linoleic acid, heating the mixture thus obtained with agitation in a closed vessel at a temperature between 125° C. and 160° C. until the gypsum is converted into plaster of Paris consisting mainly of hemihydrate crystals of squat shape, the proportion of water being sufficient to maintain a liquid phase throughout the treatment.

4. A process of producing plaster of Paris comprising mixing ground gypsum with water and substantially one part per thousand of a water-soluble salt of ricinoleic acid, heating the mixture thus obtained with agitation in a closed vessel at a temperature between 130° C. and 160° C. until the gypsum is converted into plaster of Paris consisting mainly of hemihydrate crystals of squat shape, the proportion of water being sufficient to maintain a liquid phase throughout the treatment.

CUTHBERT LESLIE HADDON.

REFERENCES CITED

The following references are of record in the file of this patent:

UNITED STATES PATENTS

| Number | Name | Date |
|---|---|---|
| 1,901,051 | Randel | Mar. 14, 1933 |
| 2,067,762 | Hoggatt | Jan. 12, 1937 |
| 2,082,887 | Haydon | June 8, 1937 |

FOREIGN PATENTS

| Number | Country | Date |
|---|---|---|
| 5,853 | Great Britain | 1904 |